(12) United States Patent
Ippatapu et al.

(10) Patent No.: US 11,223,654 B2
(45) Date of Patent: Jan. 11, 2022

(54) SYSTEM AND METHOD FOR MANAGING SECURED COMMUNICATION CHANNEL SESSIONS FOR APPLICATIONS SHARING A PORT

(71) Applicant: EMC IP Holding Company LLC, Hopkinton, MA (US)

(72) Inventors: Venkata L. R. Ippatapu, Westborough, MA (US); Kenneth M. Dorman, West Brookfield, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 223 days.

(21) Appl. No.: 16/706,621

(22) Filed: Dec. 6, 2019

(65) Prior Publication Data

US 2021/0176277 A1 Jun. 10, 2021

(51) Int. Cl.
*H04L 29/06* (2006.01)
*H04L 29/08* (2006.01)

(52) U.S. Cl.
CPC ........ *H04L 63/168* (2013.01); *H04L 63/0236* (2013.01); *H04L 63/20* (2013.01); *H04L 69/329* (2013.01)

(58) Field of Classification Search
CPC . H04L 63/168; H04L 63/0236; H04L 69/329; H04L 63/20; H04L 63/166; H04L 63/105
See application file for complete search history.

(56) References Cited

U.S. PATENT DOCUMENTS

| 11,095,706 | B1* | 8/2021 | Ankam | H04L 63/083 |
| 2003/0229786 | A1* | 12/2003 | Hollis | H04L 63/0442 713/168 |
| 2005/0220124 | A1* | 10/2005 | Oguchi | H04L 47/10 370/400 |
| 2006/0274766 | A1* | 12/2006 | Kwon | H04L 12/2859 370/401 |
| 2008/0301219 | A1* | 12/2008 | Thornburgh | H04L 67/101 709/203 |
| 2011/0167164 | A1* | 7/2011 | Fernandez Gutierrez | H04L 65/1006 709/228 |
| 2014/0009783 | A1* | 1/2014 | Chakirov | G06F 3/1204 358/1.15 |
| 2015/0012964 | A1* | 1/2015 | Xie | H04L 63/20 726/1 |

(Continued)

*Primary Examiner* — Cheng-Feng Huang
(74) *Attorney, Agent, or Firm* — Chamberlain, Hrdlicka, White, Williams & Aughtry (57) ABSTRACT

Embodiments described herein relate to techniques for establishing a secure communication channel. The techniques may include making, by an upper level protocol application, a request for an interface identifier using an interface information set; receiving the interface identifier in response to the request; providing the interface identifier and an additional information set to a security module; making a first determination, by the security module, that a protocol socket is associated with the interface identifier; making a second determination, by the security module and based on the additional information set, that a security policy is configured for establishing the secure communication channel with a remote peer device; and establishing, using the protocol socket and the security policy, the secure communication channel with the remote peer device.

14 Claims, 6 Drawing Sheets

(56) References Cited

U.S. PATENT DOCUMENTS

| | | | |
|---|---|---|---|
| 2015/0095469 A1* | 4/2015 | Kim | H04L 67/141 |
| | | | 709/220 |
| 2015/0294377 A1* | 10/2015 | Chow | G06Q 30/0282 |
| | | | 705/347 |
| 2016/0099917 A1* | 4/2016 | Glazemakers | H04L 63/0272 |
| | | | 726/12 |
| 2016/0119374 A1* | 4/2016 | Williams | H04L 63/166 |
| | | | 713/175 |
| 2016/0366250 A1* | 12/2016 | Lee | H04L 67/306 |
| 2017/0041288 A1* | 2/2017 | Stotski | H04L 69/162 |
| 2017/0102933 A1* | 4/2017 | Vora | H04L 43/0817 |
| 2017/0235509 A1* | 8/2017 | Chittenden | G06F 3/067 |
| | | | 711/163 |
| 2018/0095984 A1* | 4/2018 | Ngo | G06F 16/188 |
| 2018/0145995 A1* | 5/2018 | Roeh | H04L 43/16 |
| 2021/0266768 A1* | 8/2021 | Siripurapu | H04L 43/0852 |

* cited by examiner

SYSTEM AND METHOD FOR MANAGING SECURED COMMUNICATION CHANNEL SESSIONS FOR APPLICATIONS SHARING A PORT

BACKGROUND

Devices may be configured to exchange data with peer devices using secured communication channels. Different applications involved in the exchange of data may have associated items of information, and may have the need for different security policies to be applied based on such information.

SUMMARY

In general, in one aspect, embodiments described herein relate to a method for establishing a secure communication channel. In one or more embodiments, the method includes making, by an upper level protocol application, a request for an interface identifier using an interface information set; receiving the interface identifier in response to the request; providing the interface identifier and an additional information set to a security module; making a first determination, by the security module, that a protocol socket is associated with the interface identifier; making a second determination, by the security module and based on the additional information set, that a security policy is configured for establishing the secure communication channel with a remote peer device; and establishing, using the protocol socket and the security policy, the secure communication channel with the remote peer device.

In general, in one aspect, embodiments described herein relate to a non-transitory computer readable medium comprising computer readable program code, which when executed by a computer processor enables the computer processor to perform a method for establishing a secure communications channel. In one or more embodiments, the method includes making, by an upper level protocol application, a request for an interface identifier using an interface information set; receiving the interface identifier in response to the request; providing the interface identifier and an additional information set to a security module; making a first determination, by the security module, that a protocol socket is associated with the interface identifier; making a second determination, by the security module and based on the additional information set, that a security policy is configured for establishing the secure communication channel with a remote peer device; and establishing, using the protocol socket and the security policy, the secure communication channel with the remote peer device.

In general, in one aspect, embodiments described herein relate to system for establishing a secure communication channel. In one or more embodiments, the system includes a processor; a memory device; a persistent storage device; and an upper level protocol application executing on the processor and configured to make a request for an interface identifier using an interface information set; receive the interface identifier in response to the request; provide the interface identifier and an additional information set to a security module. In one or more embodiments, the system also includes the security module, comprising circuitry, and configured to make a first determination that a protocol socket is associated with the interface identifier; make a second determination, based on the additional information set, that a security policy is configured for establishing the secure communication channel with a remote peer device; and establish, using the protocol socket and the security policy, the secure communication channel with the remote peer device.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to systems, devices, and methods for providing secure communication channels between peer devices. A given device (e.g., a computing device) may have any number of physical ports for exchanging information with other devices. In order to facilitate secure communication of such data, secure communication channels may be established between the devices (e.g., using Internet Key Exchange (IKE) sessions). However, certain devices may be configured to allow a given physical port to be shared between two or more applications that exchange data with peer devices. For example, a given physical port may be configured to support two virtual ports. The virtual ports may exist to serve an upper level protocol application. One example of such an application is an Internet Small Computer Systems Interface (iSCSI) application for reading and writing data between the device on which the application executes and a remote storage device. Another example of such an application is a replication service application configured to replicate data to one or more remote storage devices (e.g., to facilitate disaster recovery schemes).

However, in one or more embodiments, when sharing physical ports among applications, secure communication channels may need to be established separately for the applications. To facilitate such separate secure communication channels on a single physical port, in one or more embodiments, a protocol socket used to establish a secure communication channel may be assigned on a per protocol interface basis. In one or more embodiments, a protocol interface (e.g., an IP interface) is an entity that defines certain functional aspects of transmitting data to and from a given application via a given physical port, and is associated with an interface information set (discussed further below in the description of FIGS. 1-4). In one or more embodiments, each protocol interface is configured to be associated with a separate protocol socket (e.g., a Universal Datagram Protocol (UDP) socket) to facilitate communication of data to and from applications associated with a given protocol interface. In one or more embodiments, having separate sockets for each protocol interface allows applications to reliably select the right socket to communicate over an appropriate secure communication channel Additionally, before establishing a secure communication channel, a security policy may be determined to apply to the secure communication channel, and may be based on an information set that includes items of information such as a local network address (e.g., an IP address), a network address of a peer device, the upper level protocol of the application attempting to communicate via a secure communications channel, a physical port through which data is to be exchanged, etc.

In one or more embodiments, once both the protocol socket and the security policy have been successfully identified, a secure communication channel may be established between peer devices to facilitate secure exchange of information between the devices.

One or more embodiments described herein allow for a robust framework to allow port sharing while ensuring proper protocol socket selection and security policy selection for secure communication channel establishment and use, and provide for such selections based on a variety of items of information to give greater granularity in the selections.

Figure 1:
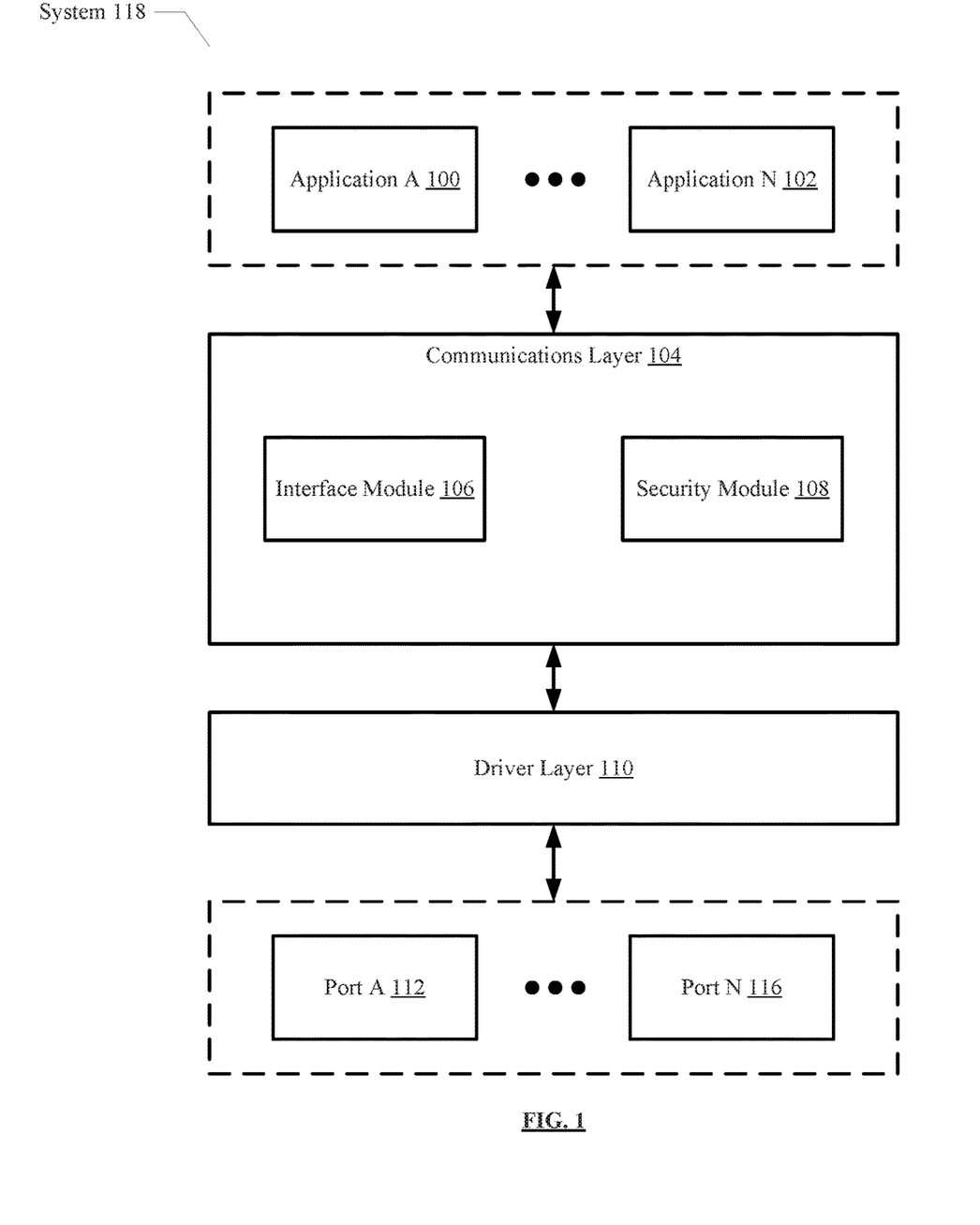
FIG. 1 shows a diagram of a system in accordance with one or more embodiments of the invention.

FIG. 1 shows a system (118) in accordance with one or more embodiments described herein. As shown in FIG. 1, the system (118) includes any number of applications (e.g., application A (100), application N (102)) and a communications layer (104). In one or more embodiments, the communications layer (104) includes an interface module (106) and a security module (108). In one or more embodiments, the system (118) also includes a driver layer (110) and any number of physical ports (e.g., port A (112), port N (116), etc.). Each of these components is described below.

In one or more embodiments, the system (118) is any device (e.g., a computing device) having one or more physical ports (112, 116) through which information may be received and/or transmitted, and that allows the physical ports to be shared by two or more applications that send or receive such information.

In one or more embodiments, a computing device is any device or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), persistent storage (not shown), one or more physical interfaces (e.g., network ports) (not shown), any number of other hardware components (not shown) and/or any combination thereof. Examples of computing devices include, but are not limited to, a server (e.g., a blade-server in a blade-server chassis, a rack server in a rack, etc.), a storage device (e.g., a fibre channel device, an iSCSI device, an Infiniband device, any combination thereof, etc.) a desktop computer, a mobile device (e.g., laptop computer, smart phone, personal digital assistant, tablet computer and/or any other mobile computing device), a network device (e.g., switch, router, multi-layer switch, etc.) such as that described above and below, a virtual machine, and/or any other type of computing device with the aforementioned requirements.

In one or more embodiments, the persistent storage (not shown) and/or memory (not shown) of a system (118) may be one or more data repositories for storing any number of data structures storing any amount of data (i.e., information). In one or more embodiments of the invention, a data repository is any type of storage unit and/or device (e.g., a file system, database, collection of tables, RAM, and/or any other storage mechanism) for storing data. Further, the data repository may include multiple different storage units and/or devices. The multiple different storage units and/or devices may or may not be of the same type or located at the same physical location.

In one or more embodiments, the persistent storage (not shown) and/or memory (not shown) of a system (118) may be considered, in whole or in part, as non-transitory computer readable mediums storing software and/or firmware.

Such software and/or firmware may include instructions which, when executed by the one or more processors (not shown) or other hardware (e.g. circuitry) of a system (118), cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape, flash memory, physical memory, or any other non-transitory computer readable medium.

In one or more embodiments, the system (118) includes any number of applications (e.g., Application A (100), Application N (102)). In one or more embodiments, an application (100, 102) is any hardware (e.g., circuitry), software, firmware, or any combination thereof that includes functionality to receive and/or transmit data between operatively connected computing devices. In one or more embodiments, an application (100, 102) transmits and/or receives data via physical ports (112, 116) of the system to/from operatively connected peer devices. In one or more embodiments, an application (100, 102) transmits and/or receives data using an upper level protocol. Examples of such protocols include, but are not limited to, iSCSI, replication applications, fibre channel, etc. In one or more embodiments, any applications that use the same underlying physical data transmission scheme may share a given physical port (112, 116) implementing that scheme. For example, both iSCSI and replication applications may use Ethernet to transmit data. Accordingly, iSCSI and replication applications, in that scenario, may share a physical port (112, 116) of the system (118), meaning that each may transmit and/or receive data using the same physical port. Another example is multiple applications using the fibre channel protocol to send and/or receive data via a shared physical port (112, 116).

In one or more embodiments, a given application (100, 102) may have a secure communication channel that is established to transmit and/or receive data between itself and a peer device (e.g., a corresponding application on another system). In one or more embodiments, a secure communication channel is a communication channel that is secured by being resistant to a third party being able to discover the content of the communication, and in which the two entities at either end of the communication channel are authenticated as being the appropriate participants in the data exchange.

A non-limiting example of a secure communication channel is created using the Internet Protocol (IP) security (IPsec) protocol. In one or more embodiments, IPsec uses a procedure to establish a secure communication channel between peer devices. To that end, a secure channel establishment protocol (e.g., Internet Key Exchange (IKE)) may be used. In one or more embodiments, IKE uses UDP packets to create security associations, which are a set of logical security parameters to help secure data that is being exchanged between peer devices. Such parameters may include specified cryptographic algorithms, pre-shared or generated cryptographic keys, and/or any other security related parameters, and each of these items may be defined by a security policy. In one or more embodiments, IKE's use of UDP packets to establish a secure communication channel requires the use of UDP sockets. In one or more embodiments, a socket is an internal endpoint for sending and/or receiving data over a network. In one or more embodiments, a socket is defined by the combination of a network address (e.g., an IP address) and a port number. A system (118) may have any number of sockets for exchanging data with peer devices without departing from the scope of embodiments described herein.

In one or more embodiments, each physical port (112, 116) of a system (118) is a function of an address (e.g., IP address), network ID, virtual LAN ID (VLAN ID). In one or more embodiments, each physical port (112, 116) in a system (118) may have similar or different of aforementioned attributes. In one or more embodiments, it is possible to have multiple different IP addresses associated with a single network ID, or to have multiple identical IP addresses on different network IDs. In one or more embodiments, a given physical port (112, 116) may have configured any number of virtual ports (not shown), each having some combination of the aforementioned attributes, which may or may not overlap with one another. In one or more embodiments, each such virtual port may have an associated construct referred to as a protocol interface (e.g., an IP interface) that is defined by the various attributes associated with a given physical port (112, 116), which may be referred to as an interface information set.

In one or more embodiments, each interface may be associated with a separate protocol socket (e.g., a UDP socket). In one or more embodiments, such associations stand in contrast to having protocol sockets implemented per protocol interface rather than per port or IP address to interact with remote peers. Such a design may help a given application in choosing the correct socket with which to connect to remote systems (not shown), and may also alleviates any issues related to duplicate IP address assignments, duplicate network IDs, duplicate VLAN IDs, etc.

In one or more embodiments, applications (100, 102) send and/or receive data, at least in part, via a communications layer (104), which is operatively connected to one or more applications (100, 102). In one or more embodiments, a communications layer (104) is any hardware (e.g., circuitry), software, firmware, or any combination thereof that includes functionality to receive and/or transmit data between one or more applications (100, 102) and a driver layer (110) (discussed further below). In one or more embodiments, the communications layer (104) includes, but is not limited to, at least a portion of a network stack. In one or more embodiments, a network stack is an implementation of a networking protocol or set of networking protocols that facilitate, at least in part, transmission of data between applications (100, 102) and physical ports (112, 116).

In one or more embodiments, a communications layer (104) also includes an interface module (106). In one or more embodiments, an interface module (106) is any hardware (e.g., circuitry), software, firmware, or any combination thereof that includes functionality to interact with an application (100, 102) and/or a security module (108) (discussed below) to provide information relating to an interface (e.g., an IP interface) to be used by an application that is identified by an interface information set (as discussed above). In one or more embodiments, an interface module is operatively connected to one or more applications and to a security module. In one or more embodiments, information identifying relevant interface may be provided to an application (100, 102) in response to receipt of an interface information set. In one or more embodiments, an interface information set received by an interface module (106) may be used to directly provide information identifying a relevant interface to a security module (108). In one or more embodiments, interface information sets are stored in a database of any type, accessible by a security module (108) and associated with an identifier of the interface. For example, such a database may be accessible by the interface module, and allows the interface module to use the interface information set to perform a lookup to derive the appropriate interface to return to the application and/or the security module.

In one or more embodiments, a communications layer (104) also includes a security module (108). In one or more embodiments, a security module is any hardware (e.g., circuitry), software, firmware, or any combination thereof that includes functionality to interact with an application and/or an interface module (discussed below) to perform certain security related functions. Such functions may include, but are not limited to, providing information identifying a protocol socket (e.g., a UDP socket) to be used as part of a secure communication channel and that is associated with an identified protocol interface, and using certain items of information received from an application (100, 102) and/or an interface module (106) to identify a security policy to be used during establishment and operation of a secure communications channel. As discussed above, information allowing a security module to identify a protocol socket may be referred to as an interface information set. Similarly, items of information for use (along with an interface identifier) in identifying a security policy for a secure communications channel may be referred to as an additional information set, and may include, but not be limited to, a physical port identifier, a local IP address, a remote IP address, and an upper level protocol of the upper level protocol application (e.g., iSCSI).

In one or more embodiments, additional information sets are stored in a database of any type (e.g., a lookup table) associated with an identifier of a relevant protocol socket and/or security policy. For example, such a database may be accessible by the security module, and allows the security module to use the additional information set to perform a lookup to derive the appropriate socket and/or security policy to use for establishing as secure communications channel with a remote peer device.

In one or more embodiments, a security module (108) includes functionality to, at least in part, establish a secure communication channel with a remote peer device using the identified protocol socket and/or security policy associated with a given protocol interface.

In one or more embodiments, a security module establishes a secure communication channel on behalf of an application (100, 102). A security module (108) may additionally or alternatively establish a secure communication channel in response to a request to do so from an application (100, 102) executing on a remote peer device. For example, a remote peer device may be executing an iSCSI application that sends to the local device on which the security module executes a request to establish a secure communication channel.

In one or more embodiments, the communications layer (104) communicates with physical ports via a driver layer (110) via an operative connection to such physical ports. In one or more embodiments, a driver layer (110) is any hardware (e.g., circuitry), software, firmware, or any combination thereof that includes functionality to facilitate the sending and/or receiving of data via one or more shared physical ports (112, 116) (e.g., physical ports shared by two or more applications (100, 102)). In one or more embodiments, a driver layer (110) includes any number of drivers for interacting with the physical ports (112, 116) of the system (118).

In one or more embodiments, a physical port (112, 116) is hardware for sending and/or receiving data to/from the system (118). In one or more embodiments, a port (112, 116) is a wired or wireless port that connects a system (118) to other devices (e.g., remote peer devices). For example, a port (112, 116) may be a port configured to accept insertion of an Ethernet cable, and to transmit and/or receive data using such a wire.

While FIG. 1 shows a configuration of components, other configurations may be used without departing from the scope of embodiments described herein. For example, there may be any number of applications. As another example, there may be any number of communication layers, each having any number of interface modules and/or security modules. As another example, there may be any number of drivers implemented in any number of driver layers. As another example, there may be any number of physical ports. As another example, there may be any number of components, software instances, etc. that are not shown in FIG. 1. Accordingly, embodiments disclosed herein should not be limited to the configuration of components shown in FIG. 1.

Figure 2A:
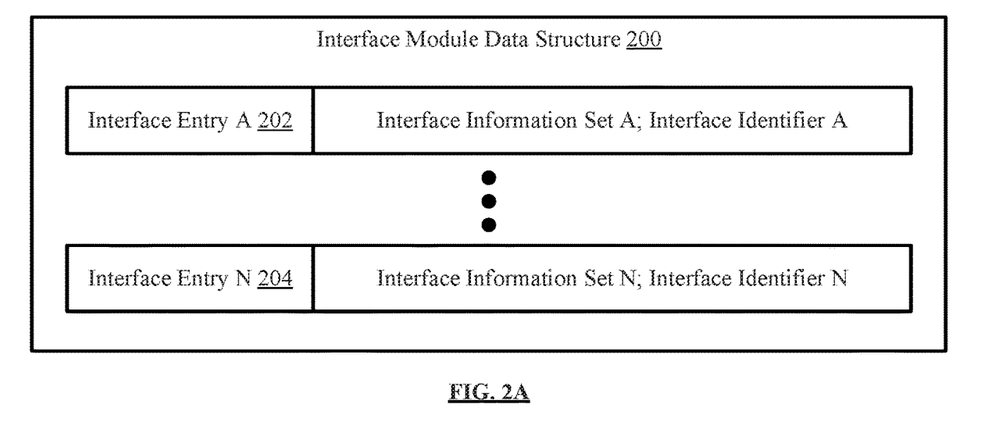
FIG. 2A shows a diagram of an example interface module in accordance with one or more embodiments of the invention.

FIG. 2A shows an interface module data structure (200) in accordance with one or more embodiments described herein. In one or more embodiments, an interface module data structure includes any number of interface entries (e.g., interface entry A (202), interface entry N (204)). Each of these components is described below.

In one or more embodiments, an interface module data structure (200) is a data repository for storing entries associating interface information sets with protocol interfaces. In one or more embodiments, a data repository is any type of storage unit and/or device (e.g., a file system, database, collection of one or more tables, RAM, and/or any other storage mechanism) for storing data. Further, the data repository may include multiple different storage units and/or devices. The multiple different storage units and/or devices may or may not be of the same type or located at the same physical location.

In one or more embodiments, an interface entry (202, 204) is any type of data entry organized in any manner that associates information identifying a protocol interface with an interface information set. As shown in FIG. 2A, interface entries (202, 204) may be used by an interface module, upon receipt of an interface information set, to perform a lookup to obtain an interface identifier. In one or more embodiments, the interface identifier is provided back from such an interface module to an application that provided the interface information set and/or to a security module for use, at least in part, in identifying a protocol socket associated with a protocol interface associated with the interface information set.

While FIG. 2A shows a configuration of components, other configurations may be used without departing from the scope of embodiments described herein. For example, there may be any number of interface data structures. As another example, there may be any number of interface entries within a given interface module data structure. As another example, interface identifiers association with interface information sets may be organized in any manner, including those that are not shown in FIG. 2A. Accordingly, embodiments disclosed herein should not be limited to the configuration of components shown in FIG. 2A.

Figure 2B:
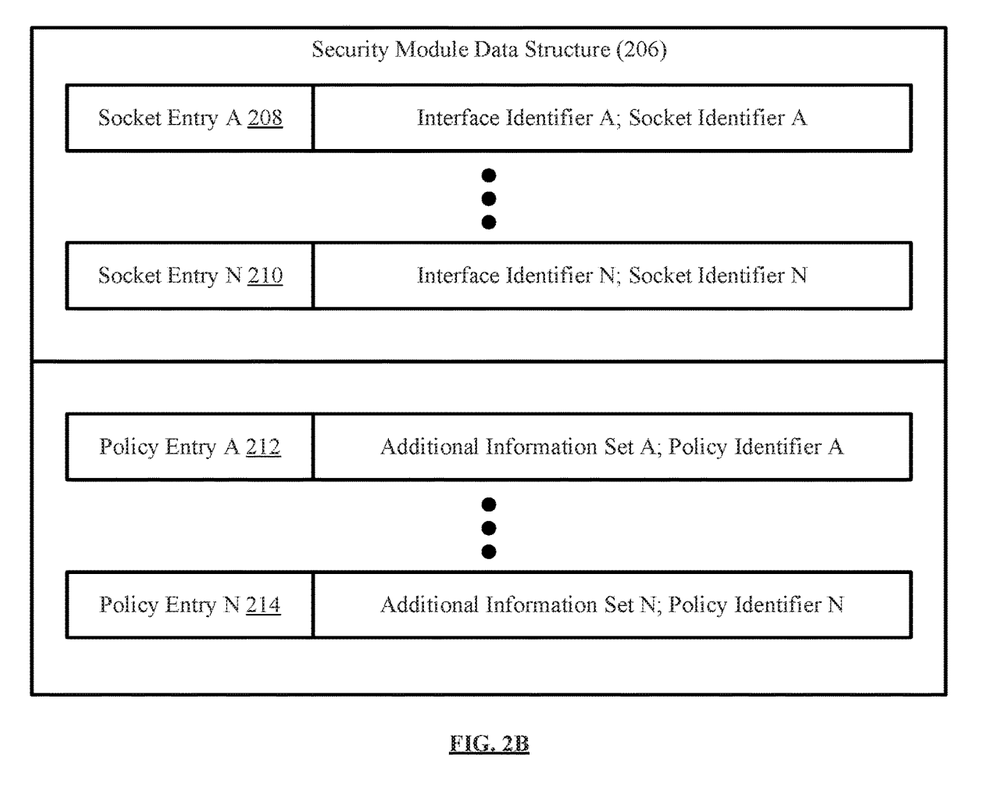
FIG. 2B shows a diagram of an example security module in accordance with one or more embodiments of the invention.

FIG. 2B shows a security module data structure (206) in accordance with one or more embodiments described herein. In one or more embodiments, a security module data structure (206) includes any number of socket entries (e.g., socket entry A (208), socket entry N (210)). Each of these components is described below.

In one or more embodiments, a security module data structure (206) is a data repository for storing entries associating interface identifiers with protocol sockets. In one or more embodiments, a data repository is any type of storage unit and/or device (e.g., a file system, database, collection of one or more tables, RAM, and/or any other storage mechanism) for storing data. Further, the data repository may include multiple different storage units and/or devices. The multiple different storage units and/or devices may or may not be of the same type or located at the same physical location.

In one or more embodiments, a socket entry (208, 210) is any type of data entry organized in any manner that associates information identifying a protocol socket with an interface identifier. As shown in FIG. 2B, socket entries (208, 210) may be used by a security module, upon receipt of an interface identifier, to perform a lookup to obtain a socket identifier. In one or more embodiments, the socket identifier used, at least in part, by a security module in identifying a protocol socket associated with a protocol interface for use in establishing a secure communications channel with a remote peer device.

In one or more embodiments, a security module data structure (206) also includes any number of policy entries (e.g., policy entry A (212), policy entry N (214)). Each of these components is described below.

In one or more embodiments, a policy entry (212, 214) is any type of data entry organized in any manner that associates an additional information set with a security policy. As shown in FIG. 2B, policy entries (212, 214) may be used by a security module, upon receipt of an additional information set, to perform a lookup to obtain a security policy. In one or more embodiments, the policy identifier used, at least in part, by a security module in identifying a security policy associated with an additional information set for use in establishing a secure communications channel with a remote peer device.

While FIG. 2B shows a configuration of components, other configurations may be used without departing from the scope of embodiments described herein. For example, there may be any number of data structures, which may or may not be part of a single larger data structure. As another example, there may be any number of socket entries and/or any number of policy entries. As another example, socket entries and/or policy entries may be organized in any manner, including those that are not shown in FIG. 2B. Accordingly, embodiments disclosed herein should not be limited to the configuration of components shown in FIG. 2B.

Figure 3:
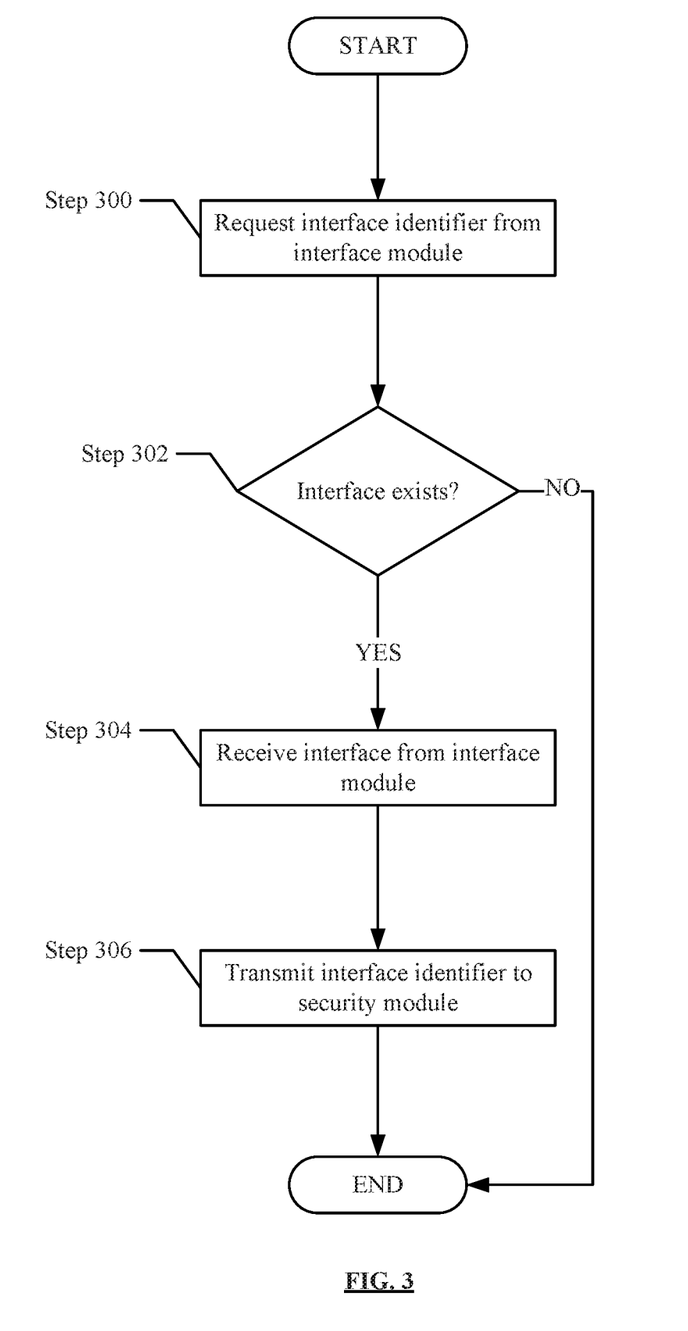
FIG. 3 shows a flowchart of a method in accordance with one or more embodiments of the invention.

FIG. 3 shows a flowchart describing a method for maintaining cohesiveness of shared data structures in accordance with one or more embodiments disclosed herein.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 300, an interface identifier is requested from an interface module. In one or more embodiments, an application requests that the interface module provide an interface identifier based on an interface information set provided to the interface module by the application. In one or more embodiments, as discussed above, the interface information set may include, but is not limited to, physical port information, a network ID, a VLAN ID, and local peer information (e.g., local IP address). An interface identifier may, for example, identify an IP interface associated with the interface information set received from the application.

In Step 302, an interface module determines whether an interface exists associated with the interface information set received from the application. In one or more embodiments, if no such interface exists, the process ends, in which case an error may be logged in some way or a user or software entity may be alerted/made aware of the failure to identify an interface corresponding to the provided interface information set. In one or more embodiments, if an interface does exist corresponding to the interface information set provided by the application, the method proceeds to Step 304.

In Step 304, the interface identifier is retrieved from the interface module. In one or more embodiments, based on a successful identification of an interface identifier associated with the interface information set received by the interface module from the application in Step 300, the interface module successfully performs a lookup to identify the interface identifier. In one or more embodiments, the interface module then provides the interface identifier to the application that provided the interface information set.

In Step 306, the interface identifier is then provided to the security module. In one or more embodiments, providing the interface identifier, along with an additional information set, allows the security module to identify a protocol socket configured to be associated with the interface identified by the interface identifier, and to identify a security policy. In one or more embodiments, the protocol socket and the security policy are then used by the security module to establish a secure communications channel with a remote peer device. The activities of the security module are discussed further in the description of FIG. 4, below. Although not shown in FIG. 3, instead of the interface identifier being transmitted to the security module by the application, the interface identifier may alternatively be transmitted to the security module directly from the interface module once it has been determined.

Figure 4:
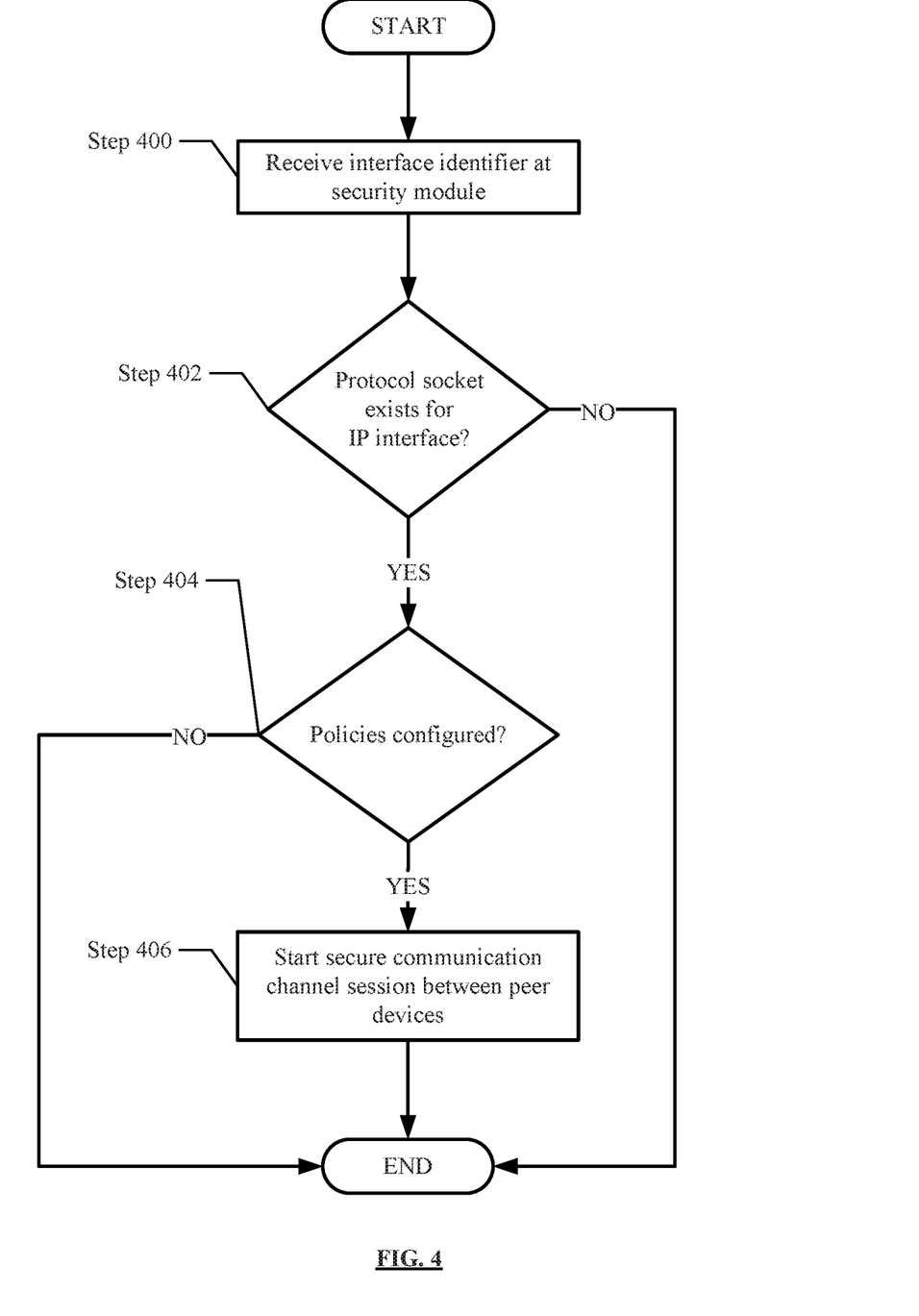
FIG. 4 shows a flowchart of a method in accordance with one or more embodiments of the invention.

FIG. 4 shows a flowchart describing a method for maintaining cohesiveness of shared data structures in accordance with one or more embodiments disclosed herein.

While the various steps in the flowchart shown in FIG. 4 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 400, an interface identifier is received at a security module. As discussed above in the description of FIG. 3, the interface identifier may be provided to the security module from an application or from an interface module.

In Step 402, the security module that received the interface identifier in Step 400 uses the interface identifier to perform a lookup to obtain a protocol socket identifier that identifies a protocol socket (e.g., a UDP socket) associated with the interface (e.g., IP interface) associated with the interface identifier. In one or more embodiments, if no such socket exists, the process ends, in which case an error may be logged in some way or a user or software entity may be alerted/made aware of the failure to identify a socket corresponding to the provided interface identifier. In one or more embodiments, if a socket does exist corresponding to the interface identifier provided to the security module, the method proceeds to Step 404.

In Step 404, the security module uses the interface identifier, the socket identifier, and/or the additional information set provided by the application to determine whether a security policy exists that is configured to be associated with the provided information. In one or more embodiments, if no such security policy exists, the process ends, in which case an error may be logged in some way or a user or software entity may be alerted/made aware of the failure to identify a security policy corresponding to the provided information. In one or more embodiments, if a security policy does exist, the method proceeds to Step 406.

In Step 406, the security module establishes a secure communications channel session between the system on which the application executes and a remote peer device. For example, the security module may use the IKE protocol to first establish an authenticated secure channel between the peer devices using a key agreement protocol, and then negotiate security associations for a given security protocol (e.g., IPsec).

Figure 5:
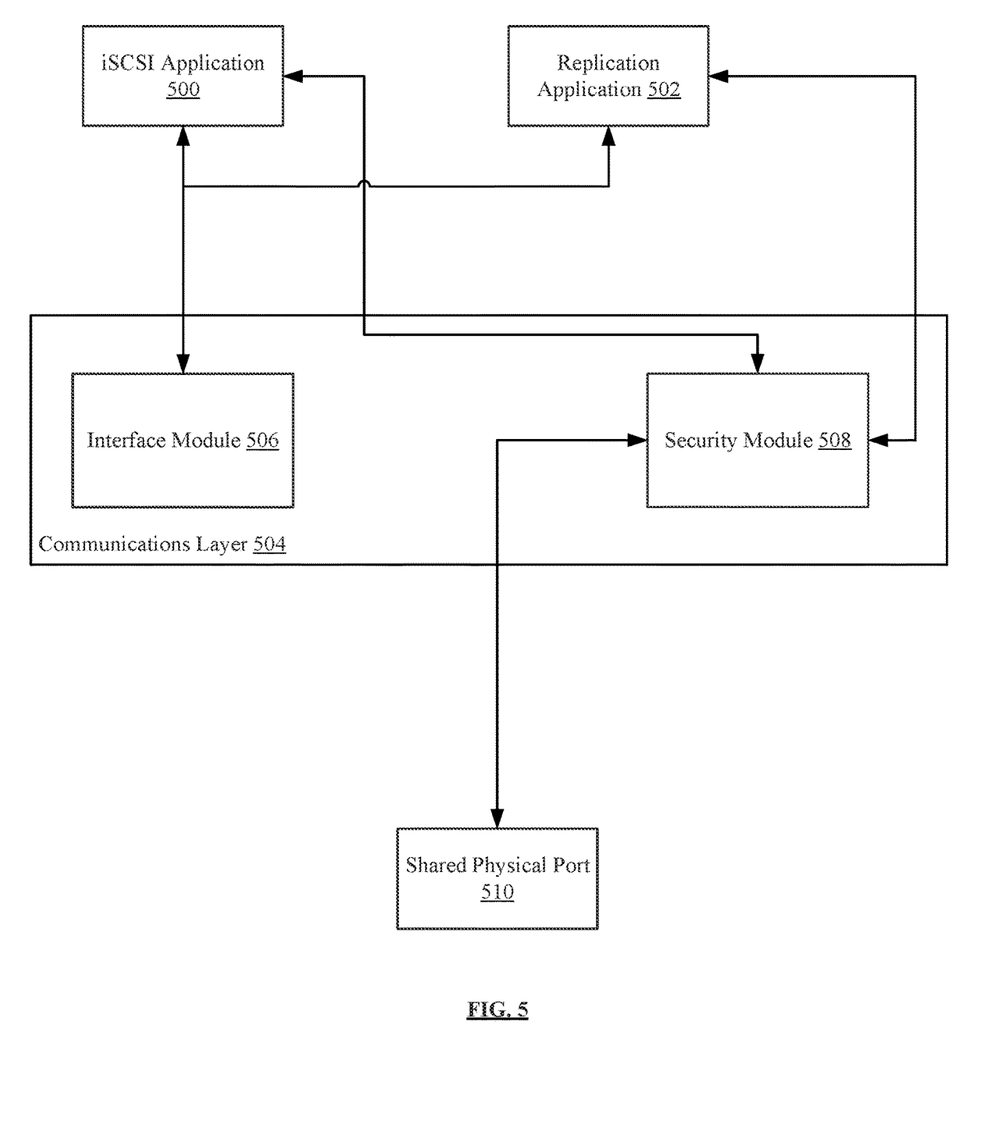
FIG. 5 shows a diagram of an example system.

FIG. 5 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Referring to FIG. 5, consider a scenario in which an iSCSI application (500) and a replication application (502) both exist in a system, and both use Ethernet to transmit and receive data from peer devices. In such a scenario, both applications (500, 502) are operatively connected to an interface module (506) in a communications layer (504). Additionally, both applications (500, 502) are operatively connected to a security module (508) of the communications layer (504). Additionally, the security module (508) is operatively connected to a physical port (510) that is shared by both the iSCSI application (500) and the replication application (502).

In this scenario, both the iSCSI application (500) and the replication application (502) require a separate secure communication channel with different peer devices with which they seek to exchange data via the shared physical port (510).

To that end, the iSCSI application (500) provides an interface information set, including a physical port identifier, a network ID, a VLAN ID, and a local IP address, to the interface module (506).

Next, the interface module (506) performs a lookup in an interface module data structure, using the interface information set, to obtain an interface identifier of an IP interface, which is provided to the iSCSI application (500).

Next, the iSCSI application (500) provides the interface identifier to the security module (508), along with an additional information set, including the physical port identifier, a local IP address, a remote peer device IP address, and an upper level protocol (iSCSI).

Next, the security module uses the interface identifier to perform a lookup in a security module data structure to obtain a UDP socket associated with the IP interface identified by the interface identifier.

Next, the security module uses the additional information set to perform a lookup to obtain a security policy associated with the additional information set.

Next, the security module uses the identified UDP socket and the identified security policy to begin establishment of a secure communication channel for the iSCSI application using the IKE protocol. Once the secure communication channel is established, the iSCSI application begins transmitting and receiving data from an iSCSI storage device using the secure communication protocol.

In a time frame that overlaps the above establishment of a secure communication channel for the iSCSI application (500), the replication application (502) provides an interface information set, including a physical port identifier, a network ID, a VLAN ID, and a local IP address, to the interface module (506).

Next, the interface module (506) performs a lookup in an interface module data structure, using the interface information set, to obtain a second interface identifier of a second IP interface, which is provided to the replication application (502).

Next, the replication application (502) provides the second interface identifier to the security module (508), along with a second additional information set, including the physical port identifier, a local IP address, a remote peer device IP address, and an upper level protocol (a replication protocol).

Next, the security module uses the second interface identifier to perform a lookup in a security module data structure to obtain a second UDP socket associated with the IP interface identified by the second interface identifier.

Next, the security module uses the second additional information set to perform a lookup to obtain a second security policy associated with the second additional information set.

Next, the security module uses the identified UDP socket and the identified security policy to begin establishment of a secure communication channel for the replication application using the IKE protocol. Once the secure communication channel is established, the replication application begins transmitting and receiving data from a replication storage peer device using the secure communication protocol.

Thus, as illustrated in FIG. 5, embodiments described herein may provide a method for establishing separate secure communications channels for various applications sharing a given physical port, allowing applications to consistently and reliably have the correct protocol sockets and security policies for the secure communications channels.

Figure 6:
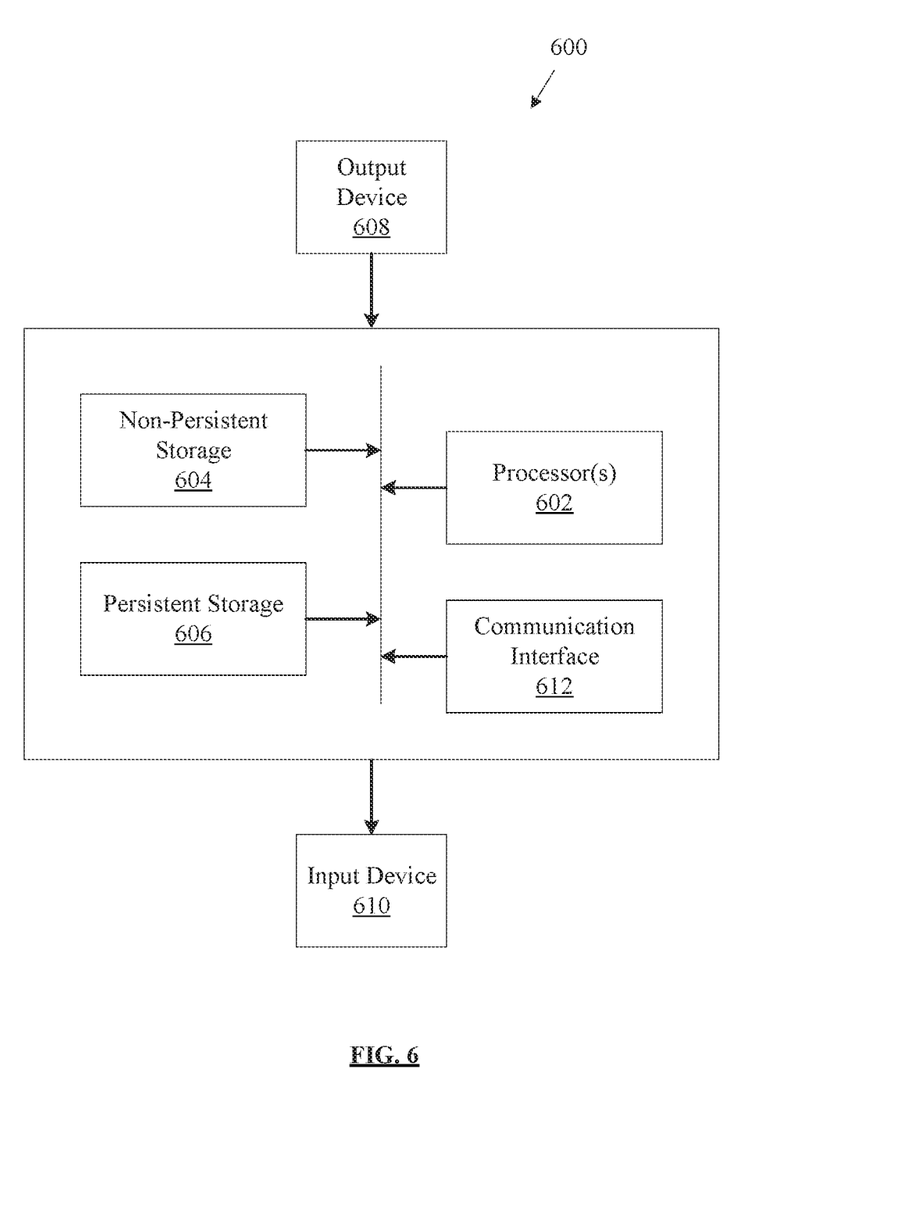
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments of the invention may provide an efficient design of protocol sockets (e.g., IKE UDP sockets) and policy match methodology for shared physical port infrastructures that would enable various applications (e.g., replication applications and host-based connection applications such as iSCSI) to select the correct socket and interface (e.g., IP interface) and use the correct security policy to negotiate proposals and finally establish a secure communication channel between entities.

The problems discussed above should be understood as being examples of problems solved by embodiments of the invention of the invention and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for establishing a secure communication channel, the method comprising:
   making, by an upper level protocol application, a request for an interface identifier using an interface information set, wherein the request is made based on a session initiation request from a remote peer device;
   receiving the interface identifier in response to the request, wherein the interface identifier identifies an interface associated with a physical port, and the physical port is shared between the upper level protocol application and a second upper level protocol application;
   providing the interface identifier and an additional information set to a security module, wherein the additional information set comprises at least one selected from a group consisting of a receiving protocol socket at which the session initiation request was received, a second interface identifier associated with a protocol socket, a physical port associated with the second interface identifier, a local Internet Protocol (IP) address associated with the second interface identifier, and a remote IP address of the remote peer device;
   making a first determination, by the security module, that the protocol socket is associated with the interface identifier;
   making a second determination, by the security module and based on the additional information set, that a security policy is configured for establishing the secure communication channel with the remote peer device; and
   establishing, using the protocol socket and the security policy, the secure communication channel with the remote peer device.

2. The method of claim 1, wherein the interface information set comprises at least one selected from a group consisting of a physical port identifier, a network identifier, a virtual local area network identifier, and a local Internet Protocol (IP) address.

3. The method of claim 1, wherein the additional information set comprises at least one selected from group consisting of a physical port identifier, a local Internet Protocol (IP) address, a remote IP address, and an upper level protocol of the upper level protocol application.

4. The method of claim 1, wherein the upper level protocol application comprises a data replication application.

5. The method of claim 1, wherein the upper level protocol application comprises a host-storage application.

6. A non-transitory computer readable medium comprising computer readable program code, which when executed by a computer processor enables the computer processor to perform a method for establishing a secure communications channel, the method comprising
   making, by an upper level protocol application, a request for an interface identifier using an interface information set, wherein the request is made based on a session initiation request from a remote peer device;
   receiving the interface identifier in response to the request, wherein the interface identifier identifies an interface associated with a physical port, and the physical port is shared between the upper level protocol application and a second upper level protocol application;
   providing the interface identifier and an additional information set to a security module, wherein the additional information set comprises at least one selected from a group consisting of a receiving protocol socket at which the session initiation request was received, a second interface identifier associated with a protocol socket, a physical port associated with the second interface identifier, a local Internet Protocol (IP) address associated with the second interface identifier, and a remote IP address of the remote peer device;
   making a first determination, by the security module, that the protocol socket is associated with the interface identifier;
   making a second determination, by the security module and based on the additional information set, that a security policy is configured for establishing the secure communication channel with the remote peer device; and
   establishing, using the protocol socket and the security policy, the secure communication channel with the remote peer device.

7. The non-transitory computer readable medium of claim 6, wherein the interface information set comprises at least one selected from a group consisting of a physical port identifier, a network identifier, a virtual local area network identifier, and a local Internet Protocol (IP) address.

8. The non-transitory computer readable medium of claim 6, wherein the additional information set comprises at least one selected from group consisting of a physical port identifier, a local Internet Protocol (IP) address, a remote IP address, and an upper level protocol of the upper level protocol application.

9. The non-transitory computer readable medium of claim 6, wherein the upper level protocol application comprises a data replication application.

10. The non-transitory computer readable medium of claim 6, wherein the upper level protocol application comprises a host-storage application.

11. A system for establishing a secure communication channel, the system comprising:
   a processor;
   a memory device;
   a persistent storage device;
   an upper level protocol application executing on the processor and configured to:
      make a request for an interface identifier using an interface information set, wherein the request is made based on a session initiation request from a remote peer device;
      receive the interface identifier in response to the request, wherein the interface identifier identifies an interface associated with a physical port, and the physical port is shared between the upper level protocol application and a second upper level protocol application;
      provide the interface identifier and an additional information set to a security module, wherein the additional information set comprises at least one selected from a group consisting of a receiving protocol socket at which the session initiation request was received, a second interface identifier associated with a protocol socket, a physical port associated with the second interface identifier, a local Internet Protocol (IP) address associated with the second interface identifier, and a remote IP address of the remote peer device;
   the security module, comprising circuitry, and configured to:
      make a first determination that the protocol socket is associated with the interface identifier;
      make a second determination, based on the additional information set, that a security policy is configured for establishing the secure communication channel with the remote peer device; and
      establish, using the protocol socket and the security policy, the secure communication channel with the remote peer device.

12. The system of claim 11, wherein
   the interface information set comprises at least one selected from a group consisting of a physical port identifier, a network identifier, a virtual local area network identifier, and a local Internet Protocol (IP) address, and
   the additional information set comprises at least one selected from group consisting of the physical port identifier, the local Internet Protocol (IP) address, a remote IP address, and an upper level protocol of the upper level protocol application.

13. The system of claim 11, wherein the upper level protocol application comprises a data replication application.

14. The system of claim 11, wherein the upper level protocol application comprises a host-storage application.

* * * * *